United States Patent
Martin

(10) Patent No.: US 6,837,129 B2
(45) Date of Patent: Jan. 4, 2005

(54) DEVICE FOR PLANISHING SAW BLADES

(76) Inventor: Aime Martin, Grande Rue, Laignes (FR), 21330

( * ) Notice: Subject to any disclaimer, the term of this patent is extended or adjusted under 35 U.S.C. 154(b) by 0 days.

(21) Appl. No.: 10/343,996
(22) PCT Filed: Aug. 7, 2001
(86) PCT No.: PCT/FR01/02564
§ 371 (c)(1), (2), (4) Date: Sep. 14, 2003
(87) PCT Pub. No.: WO02/11935
PCT Pub. Date: Feb. 14, 2002

(65) Prior Publication Data
US 2004/0025640 A1 Feb. 12, 2004

(30) Foreign Application Priority Data
Aug. 7, 2000 (FR) .............................. 00 10398

(51) Int. Cl.⁷ ............................................. B23D 63/18
(52) U.S. Cl. ............................................. 76/26; 72/18.7
(58) Field of Search ............................ 76/26, 27, 50.2; 72/16.8, 16.9, 18.7

(56) References Cited

U.S. PATENT DOCUMENTS

| | | | |
|---|---|---|---|
| 2,438,460 A | * | 3/1948 | Senard .......................... 76/26 |
| 2,623,414 A | * | 12/1952 | Senard .......................... 76/27 |
| 3,181,322 A | * | 5/1965 | Egid ........................... 72/18.7 |
| 4,852,430 A | | 8/1989 | Oppliger et al. ................ 76/27 |

FOREIGN PATENT DOCUMENTS

| | | |
|---|---|---|
| DE | 45 230 | 12/1988 |
| DE | 42 14 784 | 11/1992 |
| EP | 0 796 693 | 9/1997 |
| FR | 928 772 | 12/1947 |

OTHER PUBLICATIONS

Patent Abstracts of Japan, vol. 1997, No. 03, Mar. 31, 1997, & JP 08 290326 A (Iida Yoshikazu), Nov. 5, 1996 abrege.

* cited by examiner

Primary Examiner—Douglas D Watts
(74) Attorney, Agent, or Firm—Young & Thompson

(57) ABSTRACT

A device for planishing a band saw blades or the like, includes elements for continuously driving the blade, elements for detecting deformations of the blade and planishing elements. The detecting elements consist of position sensors integral with a table positioned underneath the blade, the sensors being uniformly spaced on a line transverse to the forward moving direction of the blade, and the planishing elements consist of hammers co-operating with an anvil positioned underneath the blade, such that, when a sensor detects a deformation of the surface of the blade body, the hammer corresponding to the sensor is actuated to even out the deformation.

11 Claims, 3 Drawing Sheets

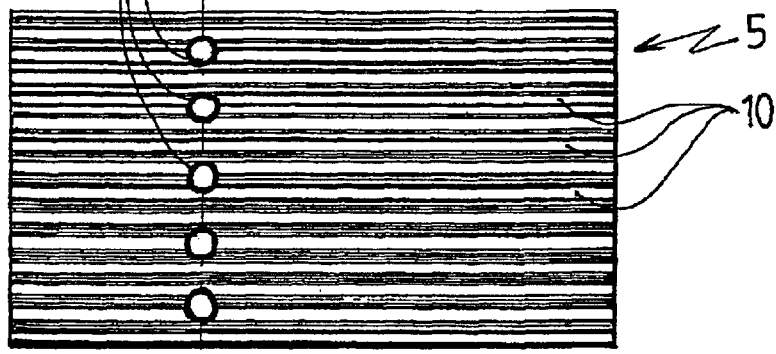
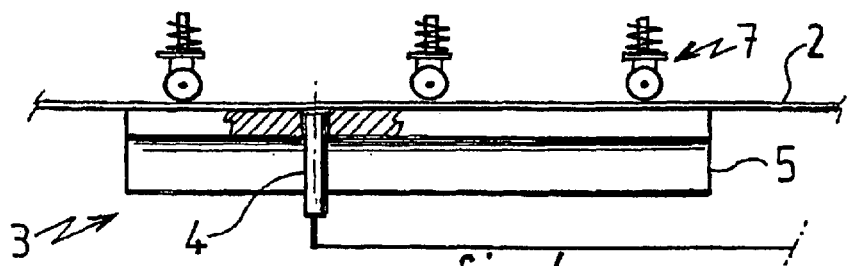
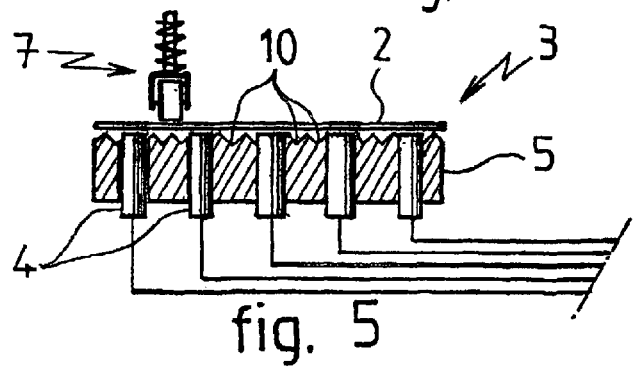
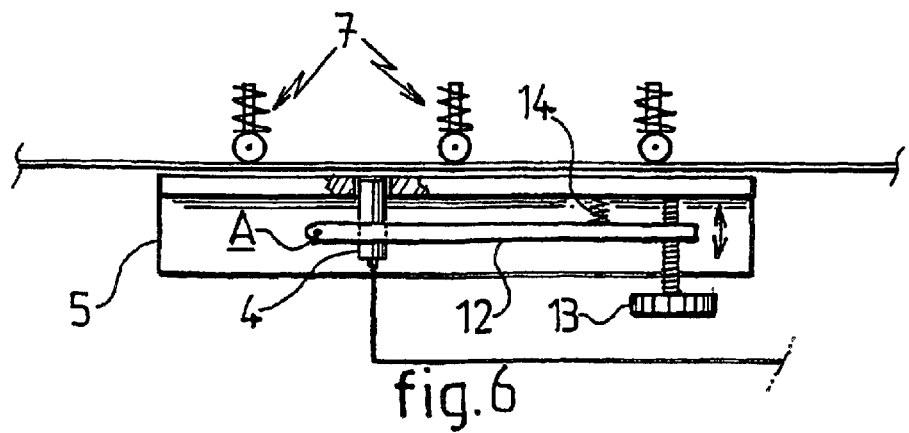

DEVICE FOR PLANISHING SAW BLADES

The present invention concerns the domain of the maintenance of saw blades and has for its object a device for planishing said blades.

In the domain of industrial saws, sawing machines are well known, called "head" or "take-up" machines, using so-called "band saw blades" positioned between two cylindrical steering wheels placed one above the other, the blade being maintained vertically and driven in a reciprocating vertical movement by said wheels. In addition to the wear of the teeth, the cut of the wood provokes deformations of the body of the blade which thus loses its surface evenness, substantially reducing the output and the quality of the cut. In effect, wood presents differences in structures such as natural, more dense knots, incrusted pebbles or metal splinters coming from the felling of the trees which, in addition to the mechanical efforts applied on the blades by the sawing machines, deform the body of the blades.

In order to maintain an acceptable output and quality of cut, the band saw blades of the sawing machines are regularly replaced, every four to five days of use in order to be planished, the planished blades then being re-used before being planished again and so on until they are definitively unusable.

To that end, devices for planishing saw blades are well known, constituted by a hollow roller and a convex roller, both motorized, between which the blade to be planished advances; this is the case, for example, of German Patent DE 4 214 784 describing a device for planishing saw blades incorporating rollers. The device comprises motorized hollow rollers and convex rollers between which the blade to be planished advances, said rollers being advantageously mounted on a chassis which is adapted to move transversely to the advance of the blade in order to cover the whole of its surface. The device further comprises means for detecting the deformations, positioned upstream of the rollers and adapted to move transversely in order to adapt the pressure exerted between the hollow roller and the convex roller, the pressure increasing with the importance of the deformations detected. However, despite the high precision of the detection means of these devices, it is particularly difficult to adapt the pressure between the rollers as a function of the deformations, with the result that the blades treated by these devices still present, after several passages between the rollers, residual deformations which alter the output of cut.

Furthermore, so-called "hammer" machines for planishing saw blades are known; this is the case for example of French Patent FR 928 772 describing a machine for planishing the saw blades, constituted by a table on the upper face of which rests the saw blade which is advanced intermittently under the control of rubber-lined drums. The machine further comprises hammers positioned on a line longitudinal with respect to the direction of displacement of the blade, said hammers being urged upwardly by the action of a spring which is lowered only when a sufficient air pressure is exerted on the pistons which terminate each of the hammers. The pressurized air, conducted via a pipe, is distributed by means of a slide valve controlled by an electromagnet to each cylinder in which the piston of a hammer extends. For each hammer to function only when a dent in the blade is located therebelow, the machine comprises detection means positioned on a line longitudinal with respect to the direction of displacement of the blade and disposed on a mobile carriage adapted to effect reciprocating movements in a direction transverse with respect to said displacement of the blade, said reciprocating movements of the carriage being used to rotate the drums intermittently in order to drive the saw blade in a longitudinal direction.

This type of machine for planishing saw blades presents the drawback of functioniong discontinuously rendering the operation of planishing of the blade particularly long and consequently expensive. It will be noted that, the means for actuating the hammers being pneumatic, they present a high inertia which is incompatible with a continuous planishing.

One of the objects of the invention is therefore to overcome all these drawbacks by proposing an entirely automatic device for planishing the band saw blades procuring a high-precision treatment.

To that end, the device for planishing a band saw blade or the like, comprising means for continuously driving the blade ensuring its positioning flat at least beneath a work zone, means for detecting the deformations of the blade and planishing means in the work zone, positioned downstream of said detection means, is noteworthy in that the detection means are constituted by position sensors fast with a table positioned underneath the blade so that the heads of said sensors are substantially at the level of the upper face of the table level with the lower face of the blade, said sensors being regularly spaced apart on a line transverse to the direction of advance of the blade, and in that the planishing means are constituted by hammers cooperating with an anvil positioned underneath the saw blade, preferably in a number identical to the sensors and constituted by preferably parallelepipedic bars extending perpendicularly to the blade level with the anvil and maintained in their position of rest above the blade by return means allowing the blade to advance between the anvil and the heads of the hammers, the latter being regularly spaced apart in the axis of the sensors and actuated by mechanical means respectively controlled by position sensors so that, when a sensor detects a deformation of the surface of the body of the blade, the hammer corresponding to said sensor is actuated to planish said deformation.

It will be understood that the whole of the surface of the blade is in principle planished in one single passage of the blade beneath the hammers while obtaining a high-precision planishing.

According to a particularly advantageous characteristic of the device according to the invention, the table comprises on its upper surface opposite the lower face of the blade, grooves which preferably extend parallel to the direction of advance of the blade in order to reduce frictions thereof on the table and to avoid soiling of the heads of the position sensors.

Other advantages and characteristics will appear more readily from the following description of several variant embodiments, given by way of non-limiting examples, of the planishing device according to the invention, with reference to the accompanying drawings, in which:

FIG. 3 is a plan view of the detection means of the device according to the invention.

FIG. 4 is a view in longitudinal section of the detection means of the device according to the invention.

FIG. 5 is a view in cross-section of the detection means of the device according to the invention.

FIG. 6 is a view in longitudinal section of a variant embodiment of the detection means of the device according to the invention.

Figure 1:
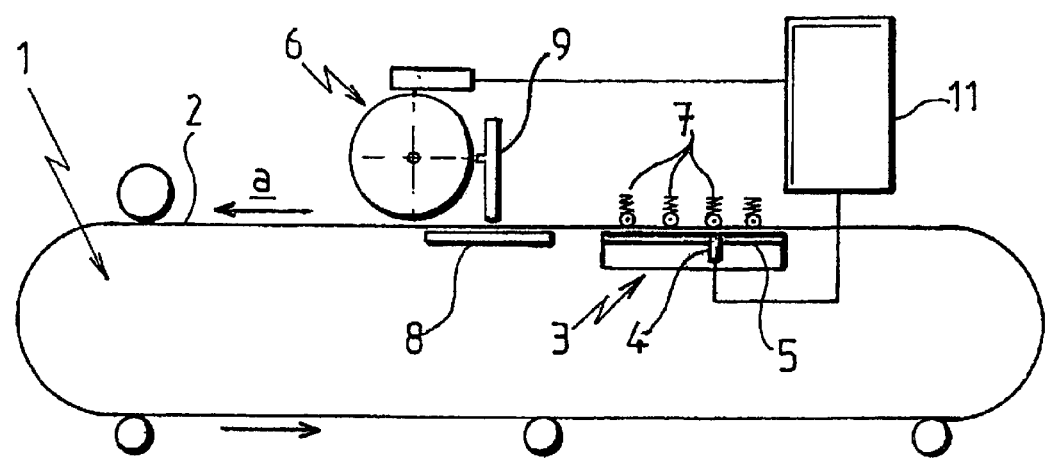
FIG. 1 is a schematic view in longitudinal section of the device according to the invention for planishing saw blades.

Referring to FIG. 1, the device for planishing a saw blade is constituted by conventional means 1 for continuously driving the blade 2 ensuring its positioning flat at least underneath a work zone, i.e. the blade 2 extends horizontally, forming a planar surface, said blade 2 advancing in this embodiment in anti-clockwise direction, by means 3 for detecting the deformations of the blades 2, constituted by position sensors 4 fast with a table 5 positioned underneath the blade 6 so that the heads of said sensors 4 are substantially at the level of the upper face of the table 5 level with the lower face of the blade 2, and with planishing means 6 positioned downstream of said detection means 3. The blade 2 is, furthermore, maintained substantially planar above the table 5 by presser rollers 7 provided with springs. The planishing means 6 are constituted by an anvil 8 formed by a metal plate for example and positioned underneath the saw blade 2, and by hammers 9 constituted by parallelepipedic bars which extend perpendicularly to the surface of the blade 2 so that it can advance between the anvil 8 and the heads of hammers 9, said hammers 9 being actuated by drive means which will be described in greater detail hereinbelow.

It goes without saying that the table 5 of the detection means 3 and the planishing means 6 are fast with a frame (not shown in the Figures), which may advantageously be the same as that of the means 1 for driving the blade 2, for example.

With reference to FIGS. 2 to 5, the position sensors 4 fast with the table 5, which in this particular example of embodiment comprises six sensors 4, are regularly spaced on a line transverse to the direction of advance of the blade 2 in order to cover the whole of its surface whatever its dimensions. With reference to FIGS. 3 and 5, the table 5 comprises, furthermore, on its upper face opposite the lower face of the blade 2, grooves 10 or the like, having for example a V-section, which advantageously extend parallel to the direction of advance of the blade 2 in order to reduce the frictions thereof on the table 5 and to avoid soiling of the heads of the position sensors 4.

It is obvious that the table 5 may comprise any number of position sensors 4 and that the grooves 10 may present any shape and extend in any direction.

Figure 2:
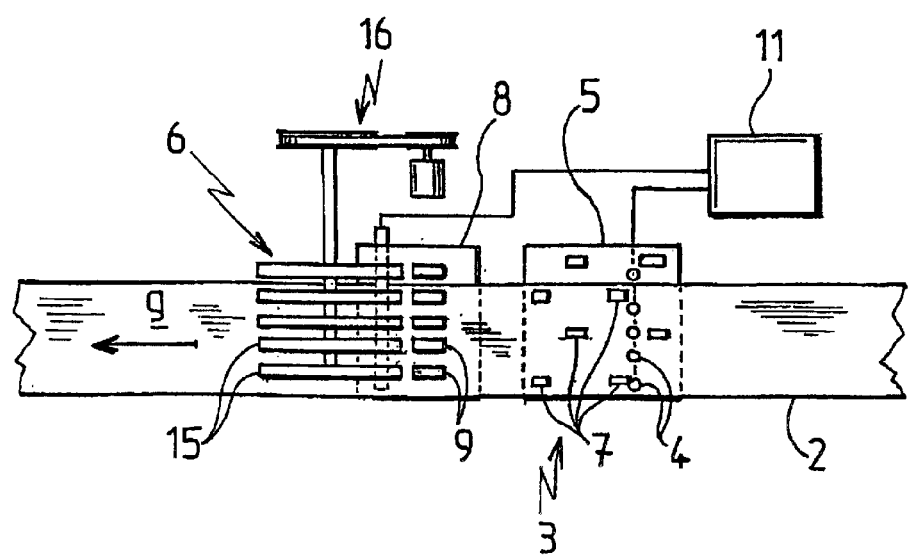
FIG. 2 is a partial schematic plan view of the device shown in FIG. 1.

With reference to FIG. 2, the device comprises an identical number of hammers 9 and of position sensors 4, precisely six in this particular example of embodiment; the hammers 9 are positioned on a line transverse to the direction of advance of the blade 2, i.e. parallel to the sensors, and the space which separates two adjacent hammers 9 is equal to the space which separates two adjacent sensors 4. Furthermore, the drive means of each hammer 9 are respectively connected to a position sensor 4 via an electronic box 11 so that, when a sensor 4 detects a deformation of the surface of the body of the blade 2 greater than a threshold of deformation predetermined in the electronic box 11, the hammer 9 corresponding to the zone of said sensor 4 is actuated to planish said deformation, as will be seen hereinbelow.

In accordance with a particularly advantageous variant embodiment of the device according to the invention, with reference to FIG. 6, the table 5 comprises means for vertically positioning the head of each sensor 4 with respect to the upper surface of said table 5 in order to vary the sensitivity of the sensors 4 and thus to obtain a planishing of greater precision. These positioning means are constituted by an arm 12 of which a first end pivots about a pin A fast with the table 5 and of which the other end comprises an adjusting screw 13 abutting on the lower face of the table 5.

The detector 4 is connected to the arm by a pivot between the two ends of said arm 12 maintained in its initial position of rest by a spring 14 of which the ends are respectively fixed to the lower face of the table 5 and to the arm 12.

Figure 7:
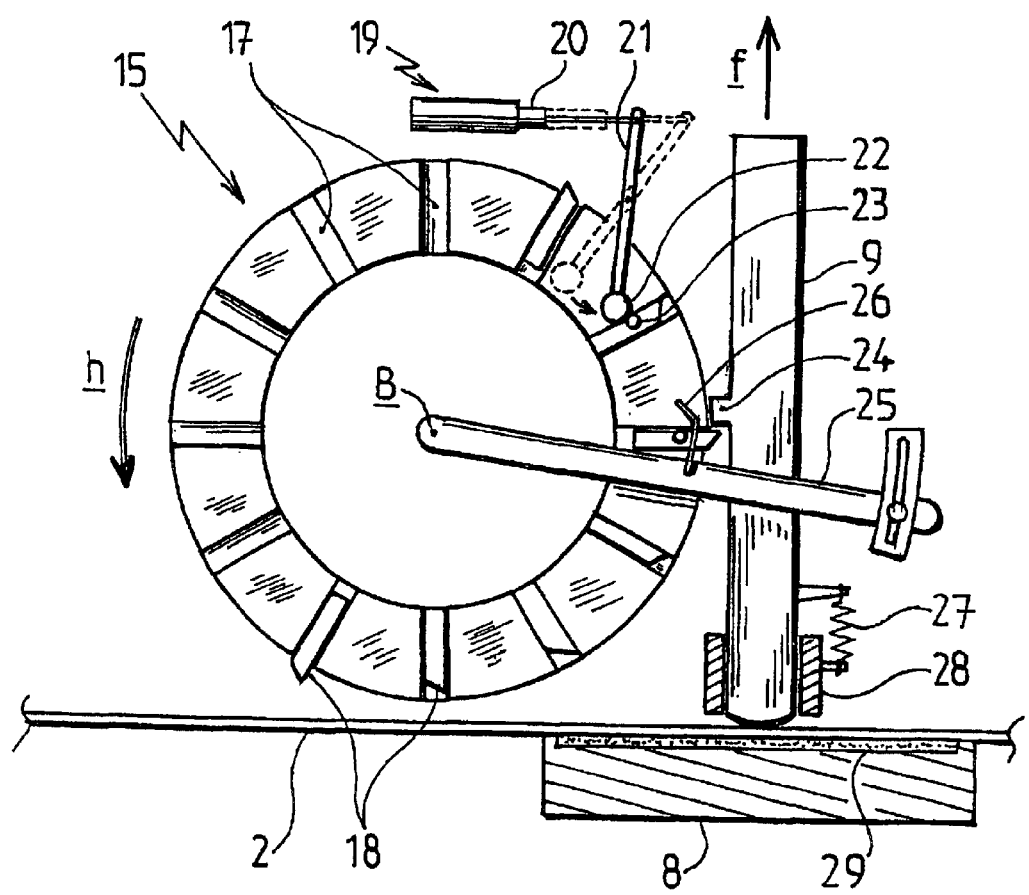
FIG. 7 is a schematic view in longitudinal section of the planishing means of the device according to the invention.

Furthermore, with reference to FIGS. 2 and 7, the means for driving each hammer 9 are constituted by a wheel 15 driven in rotation by a gear motor 16 for example, about a pin B substantially perpendicular to the direction of advance of the blade 2. Each wheel 15 comprises radial housings 17 opening out on its periphery, in which are positioned catches 18 adapted to occupy a first position of rest where they are inside their housing 17 and a second position of drive where they project on the periphery of the wheel 15. In order to take said catches 18 from their first position of rest up to their second position of drive projecting on the periphery of the wheel 15, the device comprises for each sensor 4 an electromagnetic coil 19 controlled by said sensor 4, and more precisely controlled by the electronic box 11 shown in FIG. 2, of which the rod 20 is articulated on a first end of a pivoting arm 21 provided at its other end with a roller 22 cooperating with small wheels 23 fast with each catch 18 of a wheel 15. When a catch 18 is in position of drive, projecting on the periphery of the wheel 15, it cooperates with a protuberance 24 fast with the hammer 9 corresponding to the wheel 15 in order to drive said hammer 9 in translation along the vertical axis, as indicated by arrow f of FIG. 7, until the catch 18 is returned into its first position of rest by appropriate return means, this releasing the hammer 9 which falls by its own weight onto the blade 2 advancing thereunder. The means for returning the catch 18 are for example constituted by a lever 25 of which one end is centred on the axis of rotation B of the wheel 15 and the other is angularly adjustable by a screw and a wing nut moving in an arcuate slideway, for example; the lever 25 is to that end provided with a cam groove 26 cooperating with the small wheels 23 of the catches 18 in order to take them from their second position of drive to their first position of rest.

Moreover, each hammer 9 comprises an automatic return means such as for example a spring 27 of which the ends are respectively fast with the hammer 9 and with a housing 28 in which the hammers 9 extend, maintaining the hammers 9 in a position of rest above the blade 2 after a strike, Furthermore, the head of each hammer 9 is advantageously convex in order not to leave an impression on the blade 1 and the upper face of the anvil 8 is advantageously coated with a supple material 29 such as the material known under the Trademark "ISOREL", for example, in order to absorb a part of the energy transmitted by the hammers 9 during their strike, thus avoiding their bouncing on the anvil 8.

The functioning of the device according to the invention for planishing a band saw blade will now be explained with reference to FIGS. 2 and 7.

With reference to FIG. 2, the saw blade 2 which presents in this non-limiting example a width smaller than the width of the table 5 and the planishing means 6, is driven from right to left, as indicated by arrow g, and passes above the table 5 where the position sensors 4 measure the distance separating their head from the body of said blade 2. As soon as this distance is greater than a predetermined value recorded in the electronic box 11, indicating a deformation of the blade 2, the box 11 controls the planishing means 6 positioned downstream of the table 5. The box 11 thus actuates the electromagnetic coil 19 corresponding to the sensor 4 which has detected the deformation and of which the rod 20 provokes the displacement of the roller 22 which abuts on the small wheel 23 of the catch 18, represented in solid lines in FIG. 7, to take it from its first position of rest up to its second position of drive, projecting on the periphery of the wheel 15. The catch 18 then effects a virtually complete rotation in anti-clockwise direction which corresponds to the direction of rotation of the wheel 15 as indicated by arrow h, in order finally to be positioned beneath the protuberance 24 of the hammer 9 thus lifting said hammer 9 as indicated by arrow f. The small wheel 23 of the catch 18 then engages in the cam groove 26 of the arm 25 which returns the catch 18 into its first rest position where it is inside its housing 16 thus releasing the hammer 9 which falls, under the effect of its own weight, onto the blade 1 at the location of the deformation detected by the sensor 4, in order to eliminate it. The hammer 9 then returns into its initial position of rest above the blade 2 ready for a fresh strike. The gear motor 16 simultaneously driving all the wheels 15 in the same direction, the hammers 9 may be actuated simultaneously in order to respectively correct the deformations of the zones corresponding to each of the position sensors 4, thus limiting the number of passages of the blade 2 beneath the planishing means 6.

Finally, it is obvious that the speed of rotation of the wheels 15 which depends on the speed of advance of the blade 2 may easily be adapted so that the hammer 9 corresponding to a deformation of the blade 2 detected by a sensor 4 falls at the precise location of the deformation.

What is claimed is:

1. Device for planishing a band saw blade (2) or the like, comprising means (1) for continuously driving the blade. (2) ensuring its positioning flat at least beneath a work zone, means (3) for detecting the deformations of the blade (2) and punishing means (6) in the work zone, positioned downstream of said detection means (3), characterized in that the detection means (3) are constituted by position sensors (4) fast with a table (5) positioned underneath the blade (2) so that the heads of said sensors (4) are substantially at the level of the upper face of the table (5) level with the lower face of the blade (2), said sensors (4) being regularly spaced apart on a line transverse to the direction of advance of the blade (2), and in that the planishing means (6) are constituted by hammers (9) cooperating with an anvil (8) positioned underneath the saw blade (2), preferably in a number identical to the sensors (4) and constituted by preferably parallelepipedic bars extending perpendicularly to the blade (2) level with the anvil (6) and maintained in their position of rest above the blade (2) by return means (27) allowing the blade to advance between the anvil (8) and the heads of the hammers (9), the latter being regularly spaced apart in the axis of the sensors (4) and actuated by mechanical drive means respectively controlled by position sensors (4) so that, when a sensor (4) detects a deformation of the surface of the body of the blade (2), the hammer (9) corresponding to said sensor (4) is actuated to planish said deformation.

2. Device according to claim 1, characterized in that the table (5) comprises on its upper face opposite the lower face of the blade (2) grooves (10) or the like.

3. Device according to claim 2, characterized in that the grooves (10) extend parallel to the direction of advance of the blade (2).

4. Device according to claim 1 characterized in that the table (5) comprises means for positioning the head of each sensor (4) with respect to the upper surface of said table (5).

5. Device according to claim 4, characterized in that the adjusting means are constituted by an arm (12) of which a first end pivots about a pin A fast with the table (5) and of which the other end comprises an adjusting screw (13) abutting on the lower face of the table (5), a sensor (4) being connected to the arm (12) by a pivot between the two ends of said arm (12) which is maintained in its initial position of rest by a spring (14) whose ends are respectively fixed to said lower face and to the arm (12).

6. Device according to claim 1, characterized in that the anvil (8) comprises a supple coating (29) on its upper face in order to absorb a part of the energy transmitted by the hammers (9) during planishing.

7. Device according to claim 1, characterized in that the means for driving each hammer (9) are constituted by a wheel (15) driven in rotation about an axis B substantially perpendicular to the direction of advance of the blade (2), comprising on its periphery radial housings (16) in which are positioned catches (18) adapted to occupy a first position of rest where they are inside the housings (16) and a second position of drive where they project on the periphery of the wheel (15) in order to drive the hammer (9) in translation along the vertical axis, cooperating with a protuberance (24) fast with the hammer (9) until the catch (18) is returned into its first position by return means, thus releasing the hammer (9) which falls under the effect of its own weight onto the blade (2), before returning into initial position of rest above the blade (2) by return means, ready for a fresh strike.

8. Device according to claim 7, characterized in that it comprises for each sensor (4) an electromagnetic coil (19) controlled by said sensor (4), of which the rod (20) is articulated on a first end of a "pivoting arm" (21) provided at its other end with a roller (22) cooperating with small wheels (23) fast with each catch (18) of a wheel (15) in order to take said catches (18) from their first position of rest up to their second position of drive projecting on the periphery of the wheel (15).

9. Device according to claim 7, characterized in that the means for return of the catches (18) of each wheel (15) are obtained by a lever (25) of which one end is centered on the axis of rotation B of the wheel (15) and the other is adjustable angularly by appropriate means, said lever (25) being provided with a cam groove (26) cooperating with the email wheels (23) of the catches (18) to take them from their second position of drive up to their first position of rest.

10. Device according to claim 1, characterized in that the head of each hammer (9) is convex.

11. Device according to claim 8, characterized in that the means for return of the catches (18) of each wheel (15) are obtained by a lever (25) of which one end is centered on the axis of rotation B of the wheel (15) and the other is adjustable angularly by appropriate means, said lever (25) being provided with a cam groove (26) cooperating with the small wheels (23) of the catches (18) to take them from their second position of drive up to their first position of rest.

* * * * *